United States Patent
Bevilaqua et al.

(10) Patent No.: US 9,000,699 B2
(45) Date of Patent: Apr. 7, 2015

(54) DETERMINATION OF MAGNETIC FLUX AND TEMPERATURE OF PERMANENT MAGNETS IN WASHING MACHINE MOTOR

(75) Inventors: Matheus A. Bevilaqua, Joinville (BR);
Luiz V. Dokonal, Joinville (BR);
Evandro J. Meurer, Joinville (BR);
Fernando P. Silva, Joinville (BR);
Marcelo C. Silva, Joinville (BR);
Rodrigo S. Teixeira, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 428 days.

(21) Appl. No.: 13/293,607

(22) Filed: Nov. 10, 2011

(65) Prior Publication Data
US 2013/0119905 A1 May 16, 2013

(51) Int. Cl.
*H02H 7/09* (2006.01)
*H02P 6/18* (2006.01)
*H02P 29/00* (2006.01)
*D06F 33/02* (2006.01)
*D06F 37/30* (2006.01)

(52) U.S. Cl.
CPC ............ *H02P 6/182* (2013.01); *H02P 29/0083* (2013.01); *D06F 33/02* (2013.01); *D06F 37/304* (2013.01); *D06F 2202/04* (2013.01); *D06F 2202/12* (2013.01); *D06F 2204/065* (2013.01)

(58) Field of Classification Search
USPC .............. 318/400.01, 400.02, 400.2, 400.22, 318/400.26, 400.34, 400.35, 434
See application file for complete search history.

(56) References Cited

U.S. PATENT DOCUMENTS

| | | | |
|---|---|---|---|
| 4,011,489 A | | 3/1977 | Franz et al. |
| 4,641,066 A | * | 2/1987 | Nagata et al. ............. 318/400.37 |
| 4,642,536 A | * | 2/1987 | Boyd et al. ............... 318/400.12 |
| 4,642,537 A | | 2/1987 | Young |
| 4,743,815 A | * | 5/1988 | Gee et al. ................. 318/400.11 |
| 5,321,342 A | | 6/1994 | Kruse |
| 5,345,156 A | | 9/1994 | Moreira |
| 5,422,570 A | * | 6/1995 | Moreira ........................ 324/177 |
| 5,473,240 A | | 12/1995 | Moreira |
| 5,635,810 A | * | 6/1997 | Goel ............................. 318/719 |
| 5,739,664 A | | 4/1998 | Deng et al. |

(Continued)

FOREIGN PATENT DOCUMENTS

| | | |
|---|---|---|
| DE | 3736303 A1 | 5/1989 |
| EP | 1835062 A1 | 9/2007 |

(Continued)

OTHER PUBLICATIONS

European Search Report for Corresponding EP 12191284.4, Apr. 14, 2014.

*Primary Examiner* — Bentsu Ro
*Assistant Examiner* — Thai Dinh

(57) ABSTRACT

According to one illustrative embodiment, a washing machine comprises a motor including a plurality of coils and one or more permanent magnets, an inverter configured to supply current to the plurality of coils and to measure a back electromotive force (BEMF) waveform from the plurality of coils, and an electronic control unit (ECU) configured to (i) integrate the BEMF waveform to generate an integrated BEMF waveform, (ii) determine a magnetic flux of the one or more permanent magnets using an amplitude of the integrated BEMF waveform, and (iii) control the current supplied by the inverter based at least in part upon the determined magnetic flux.

20 Claims, 3 Drawing Sheets

(56) References Cited

U.S. PATENT DOCUMENTS

| | | | |
|---|---|---|---|
| 5,796,194 | A | 8/1998 | Archer et al. |
| 5,864,192 | A | 1/1999 | Nagate et al. |
| 5,920,162 | A * | 7/1999 | Hanson et al. ........... 318/400.04 |
| 6,462,495 | B1 | 10/2002 | Copeland |
| 6,841,969 | B1 | 1/2005 | Schulz et al. |
| 6,901,212 | B2 | 5/2005 | Masino |
| 6,903,525 | B2 | 6/2005 | Carson et al. |
| 7,157,878 | B2 | 1/2007 | Collier-Hallman |
| 7,429,840 | B2 | 9/2008 | Pollock et al. |
| 7,592,766 | B2 | 9/2009 | Patel et al. |
| 7,893,643 | B2 * | 2/2011 | Bonvin ........................ 318/561 |
| 8,519,648 | B2 * | 8/2013 | Gallegos-Lopez et al. ........................ 318/400.02 |
| 8,618,756 | B2 * | 12/2013 | Hung et al. .............. 318/400.07 |
| 8,836,260 | B2 * | 9/2014 | Fulton ...................... 318/400.34 |
| 2004/0183490 | A1 * | 9/2004 | Maeda .......................... 318/375 |
| 2004/0249596 | A1 * | 12/2004 | Ho ................................. 702/106 |
| 2006/0038517 | A1 | 2/2006 | MacKay |
| 2007/0069669 | A1 | 3/2007 | MacKay |
| 2007/0282461 | A1 | 12/2007 | Harwood |
| 2009/0140676 | A1 | 6/2009 | Son et al. |
| 2010/0060217 | A1 | 3/2010 | Ikeda et al. |
| 2010/0276929 | A1 | 11/2010 | Jansen |
| 2010/0327585 | A1 | 12/2010 | Cao et al. |
| 2011/0095713 | A1 | 4/2011 | Son et al. |

FOREIGN PATENT DOCUMENTS

| | | |
|---|---|---|
| GB | 2176068 A | 12/1986 |
| WO | 2006014150 A1 | 2/2006 |

* cited by examiner

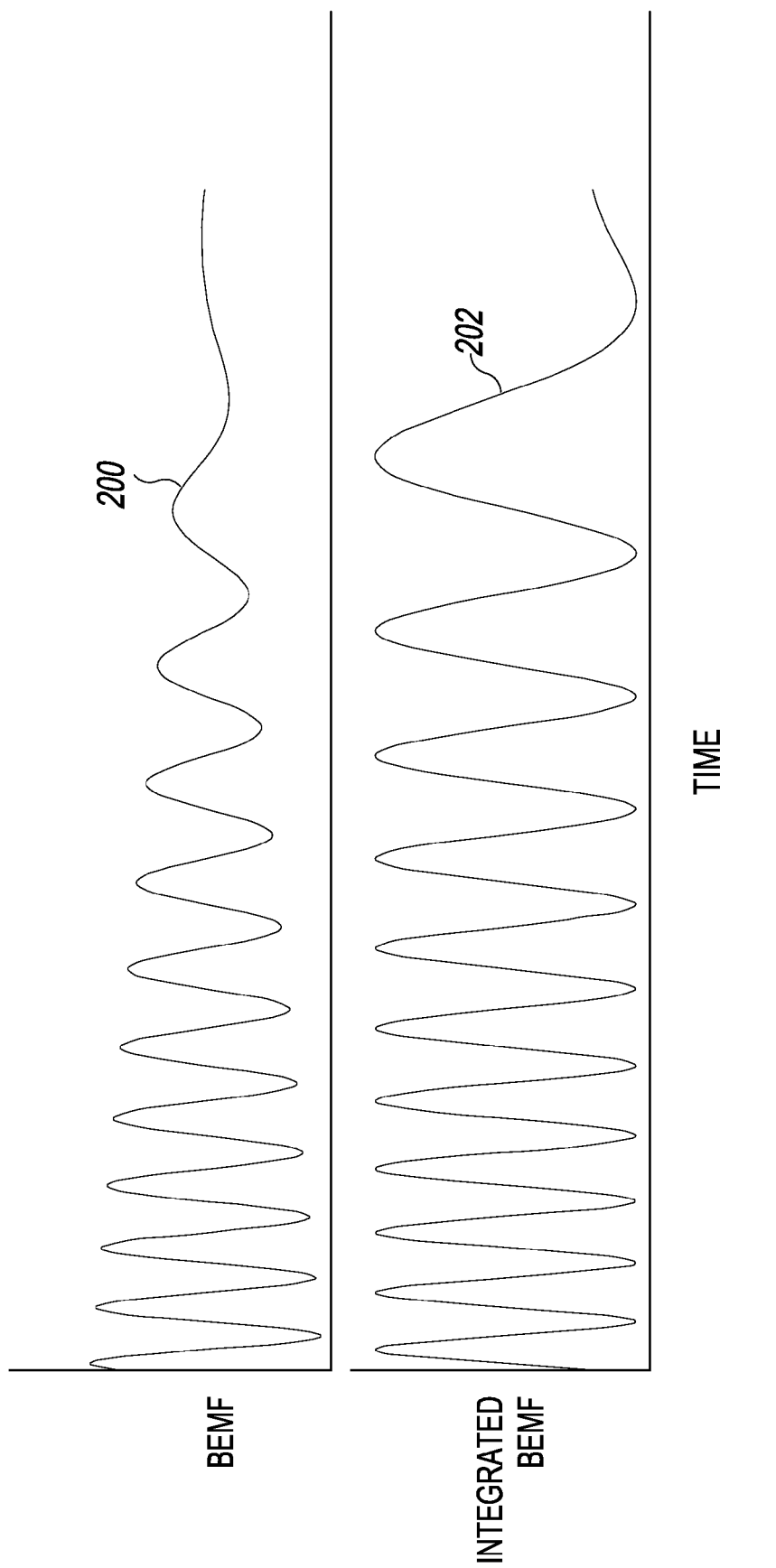

DETERMINATION OF MAGNETIC FLUX AND TEMPERATURE OF PERMANENT MAGNETS IN WASHING MACHINE MOTOR

TECHNICAL FIELD

The present disclosure relates, generally, to drive systems for washing machines and, more particularly, to drive systems capable of determining a magnetic flux and a temperature of one or more permanent magnets in a washing machine motor.

BACKGROUND

A washing machine is a domestic appliance for cleaning clothes, linens, and other laundry. A washing machine may include a tub and a drum that is positioned in the tub and is sized to receive laundry for cleaning. The washing machine may include an electric motor that causes the drum to rotate relative to the tub during a washing operation. In some washing machines, the electric motor may be connected to the drum via a transmission system including, for example, cables and pulleys. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a plurality of coils. The rotor may include one or more permanent magnets that interact with a magnetic field produced by one or more of the plurality of coils. During operation, the plurality of coils may be sequentially energized with electricity to cause the rotor to rotate. In a direct drive washing machine, the rotor may be torsionally secured to the drive shaft so that drive force may be transferred to the drum via the drive shaft.

SUMMARY

According to one aspect, a washing machine may comprise a motor including a plurality of coils and one or more permanent magnets, an inverter configured to supply current to the plurality of coils and to measure a back electromotive force (BEMF) waveform from the plurality of coils, and an electronic control unit (ECU) configured to (i) integrate the BEMF waveform to generate an integrated BEMF waveform, (ii) determine a magnetic flux of the one or more permanent magnets using an amplitude of the integrated BEMF waveform, and (iii) control the current supplied by the inverter based at least in part upon the determined magnetic flux.

In some embodiments, the ECU may be further configured to control the inverter to measure the BEMF waveform while supplying no current to the plurality of coils. In other embodiments, the ECU may be further configured to determine a temperature of the one or more permanent magnets by comparing the determined magnetic flux to a known magnetic flux corresponding to a known temperature. In such embodiments, the ECU may be further configured to control the current supplied by the inverter based at least in part upon the determined temperature of the one or more permanent magnets.

In other embodiments, the ECU may be further configured to determine a temperature T of the one or more permanent magnets using the relationship $\Phi=\Phi_0[1-k(T-T_0)]$, where $\Phi$ is the determined magnetic flux of the one or more permanent magnets, $\Phi_0$ is a known magnetic flux of the one or more permanent magnets corresponding to a known temperature $T_0$, and k is a constant for the motor. In still other embodiments, the ECU may be further configured to determine, using the determined magnetic flux, an optimized current for starting the motor from a resting state.

According to another aspect, a method may comprise measuring a back electromotive force (BEMF) waveform from a motor of a washing machine, integrating the BEMF waveform to generate an integrated BEMF waveform, determining a magnetic flux of one or more permanent magnets of the motor using an amplitude of the integrated BEMF waveform, and controlling a current supplied to the motor based at least in part upon the determined magnetic flux.

In some embodiments, measuring the BEMF waveform may comprise measuring the BEMF waveform using an inverter of the washing machine that supplies current to the motor. In other embodiments, measuring the BEMF waveform may comprise measuring the BEMF waveform while no current is being supplied to the motor. In such embodiments, measuring the BEMF waveform may comprise measuring the BEMF waveform while a drum of the washing machine decelerates.

In other embodiments, the method may further comprise determining a temperature of the one or more permanent magnets by comparing the determined magnetic flux to a known magnetic flux corresponding to a known temperature. In such embodiments, controlling the current supplied to the motor may comprise controlling the current supplied to the motor based at least in part upon both the determined magnetic flux and the determined temperature of the one or more permanent magnets.

In other embodiments, the method may further comprise determining a temperature T of the one or more permanent magnets using the relationship $\Phi=\Phi_0[1-k(T-T_0)]$, where $\Phi$ is the determined magnetic flux of the one or more permanent magnets, $\Phi_0$ is a known magnetic flux of the one or more permanent magnets corresponding to a known temperature $T_0$, and k is a constant for the motor. In still other embodiments, the method may further comprise determining, using the determined magnetic flux, an optimized current for starting the motor from a resting state.

According to yet another aspect, one or more non-transitory, machine-readable media may comprise a plurality of instructions which, when executed, cause an electronic control unit (ECU) of a washing machine to receive a back electromotive force (BEMF) waveform measured from a motor of the washing machine, integrate the BEMF waveform to generate an integrated BEMF waveform, determine a magnetic flux of one or more permanent magnets of the motor using an amplitude of the integrated BEMF waveform, and control a current supplied to the motor based at least in part upon the determined magnetic flux.

In some embodiments, the plurality of instructions may further cause the ECU to receive a BEMF waveform that was measured while no current was supplied to the motor. In other embodiments, the plurality of instructions may further cause the ECU to determine a temperature of the one or more permanent magnets by comparing the determined magnetic flux to a known magnetic flux corresponding to a known temperature. In such embodiments, the plurality of instructions may further cause the ECU to control the current supplied to the motor based at least in part upon the determined temperature of the one or more permanent magnets.

In other embodiments, the plurality of instructions may further cause the ECU to determine a temperature T of the one or more permanent magnets using the relationship $\Phi=\Phi_0[1-k(T-T_0)]$, where $\Phi$ is the determined magnetic flux of the one or more permanent magnets, $\Phi_0$ is a known magnetic flux of the one or more permanent magnets corresponding to a known temperature $T_0$, and k is a constant for the motor. In still other embodiments, the plurality of instructions may further cause the ECU to determine, using the determined magnetic flux, an optimized current for starting the motor from a resting state.

BRIEF DESCRIPTION OF THE DRAWINGS

The detailed description particularly refers to the following figures, in which:

FIG. 3 is a graph representing an illustrative back electromotive force (BEMF) waveform and its corresponding integrated BEMF waveform.

DETAILED DESCRIPTION OF THE DRAWINGS

Figure 1:
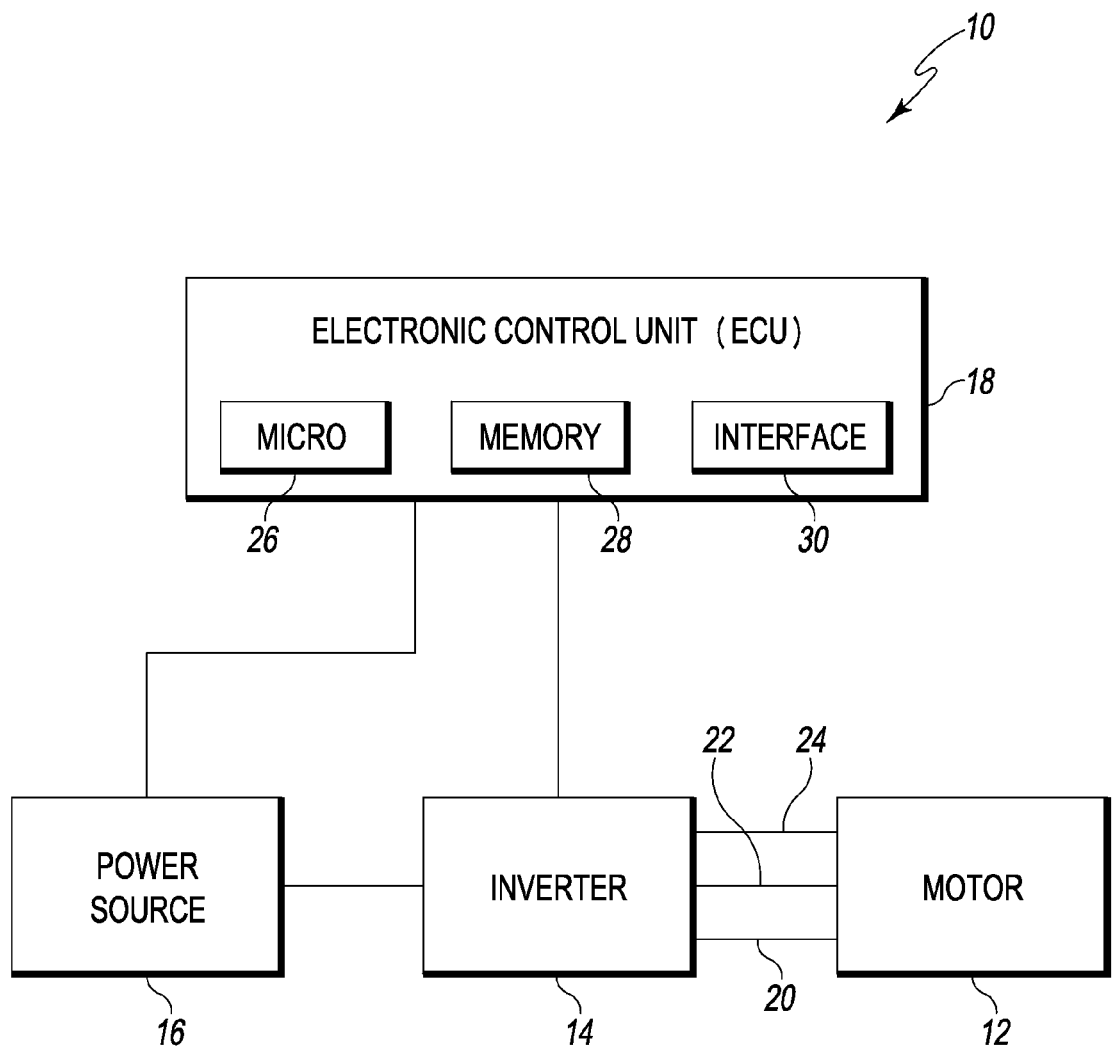
FIG. 1 is a simplified block diagram of one illustrative embodiment of a drive system of a washing machine.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as the types and interrelationships of system components may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Embodiments of the disclosed systems and methods may be implemented in hardware, firmware, software, or any combination thereof. Embodiments of the disclosed systems and methods implemented in a washing machine may include one or more point-to-point interconnects between components and/or one or more bus-based interconnects between components. Embodiments of the disclosed systems and methods may also be implemented as instructions stored on one or more non-transitory, machine-readable media, which may be read and executed by an electronic control unit. A non-transitory, machine-readable medium may include any mechanism for storing or transmitting information in a form readable by a machine (e.g., a processor). For example, non-transitory, machine-readable media may include read only memory (ROM), random access memory (RAM), magnetic disk storage, optical storage, flash memory, and/or other types of memory devices.

Referring now to FIG. 1, some of the components of a drive system 10 of a washing machine, according to one illustrative embodiment, are shown in a simplified block diagram. The drive system 10 illustratively includes an electric motor 12, an inverter 14, a power source 16, and an electronic control unit 18. In some embodiments, the drive system 10 may include additional and/or different components than those shown in FIG. 1 and described herein. The drive system 10 of the washing machine generally controls the rotation of a drum relative to a tub to wash clothes, linens, and other laundry during a washing operation of the washing machine.

The drive system 10 includes an electric motor 12, which may be connected to the drum of the washing machine indirectly via a transmission system or directly via a drive shaft, as described above. In the illustrative embodiment of FIG. 1, the motor 12 comprises a brushless, alternating current (AC) motor (also known as a permanent magnet synchronous motor). It will be appreciated that, in other embodiments, other types of electric motors may be used as the electric motor 12. As described above, the motor 12 includes a stator and a rotor configured to rotate relative to the stator (not shown). It is contemplated that both inner and outer rotor configurations may be used with the present disclosure. The motor 12 includes a plurality of coils (typically, positioned on the stator) and one or more permanent magnets (typically, positioned on the rotor). During operation, the plurality of coils may be sequentially supplied with current to generate magnetic fields that interact with the one or more permanent magnets and, thus, cause the rotor to rotate.

The operation of the motor 12 may be enhanced by accurate determination of the magnetic flux and/or the temperature of the one or more permanent magnets of the motor 12 (these characteristics of the permanent magnets typically vary during operation of the motor 12). For instance, where the magnetic flux of the one or more permanent magnets is accurately known, the currents supplied to the plurality of coils of the motor 12 may be minimized or maximized within safe limits, depending on the desired performance. Lower motor currents may result in lower temperatures in the components of the motor 12 (e.g., the permanent magnets), which may improve the performance of and decrease the production cost of the motor 12. Furthermore, for certain types of permanent magnets that may be used in the motor 12 (e.g., rare-earth magnets, such as NdFeB magnets), accurately determining temperature can minimize the risk of irreversible demagnetization.

The drive system 10 also includes an inverter 14 that draws electrical power from a power source 16 and supplies current to the plurality of coils of the motor 12. In some embodiments, the power source 16 may be an AC mains power supply (e.g., 120 V, 60 Hz) to which the washing machine is connected. In the illustrative embodiment, the power source 16 further comprises a power regulating circuit which also transforms AC mains power into direct current (DC) power and supplies this DC power to the electronic control unit 18. The inverter 14 is configured to sequentially supply current to the plurality of coils of the motor 12 over the electrical connections 20, 22, 24. In the illustrative embodiment of FIG. 1, the motor 12 comprises three coils and, thus, includes three electrical connections 20, 22, 24 to the inverter 14 (i.e., one for each coil). It is contemplated that, in other embodiments, the motor 12 may comprise additional or fewer coils and have additional or fewer electrical connections to the inverter 14.

The inverter 14 of the drive system 10 is further configured to measure a back electromotive force (BEMF) waveform from the motor 12 and supply the BEMF waveform (or information concerning the BEMF waveform) to the electronic control unit 18. When no currents are supplied to the motor 12 by the inverter 14 but the rotor of the motor 12 continues to rotate (due to momentum from previous operation of the motor 12), the motor 12 essentially operates as an electric generator. Under such conditions, the one or more permanent magnets of the motor 12 will induce voltages on the plurality of coils of the motor 12. These voltages are commonly referred to as "back electromotive force." The BEMF produced by the motor 12 will be proportional to the time derivative of the magnetic flux of the one or more permanent magnets of the motor 12.

In the illustrative embodiment, the inverter 14 measures the BEMF waveform produced by the motor 12 while supplying no current to the plurality of coils (i.e., no current is supplied along any of the electrical connections 20, 22, 24). In other embodiments, however, the inverter 14 may be capable of measuring a BEMF waveform while supplying currents to one or more of the plurality of coils of the motor 12. Furthermore, although the inverter 14 is capable of measuring the BEMF waveform in the illustrative embodiment, it is also contemplated that one or more voltage sensors (separate from the inverter 14) may be positioned along one or more of the electrical connections 20, 22, 24 to measure a BEMF waveform.

The drive system 10 also includes an electronic control unit (ECU) 18. The ECU 18 may be a dedicated controller for the drive system 10, or the ECU 18 may also control additional functions of the washing machine. The ECU 18 is, in essence, the master computer responsible for interpreting electrical signals sent by controls and sensors associated with the drive system 10 (and other components of the washing machine, in some embodiments) and for activating or energizing electronically-controlled components associated with the drive system 10 (and other components of the washing machine, in some embodiments). For example, the ECU 18 is configured to control the inverter 14 to supply current to the plurality of coils of the motor 12, to receive various signals from the inverter 14 (e.g., a BEMF waveform, or information related thereto), and to determine when various operations of the drive system 10 should be performed, amongst many other things. In particular, as will be described in more detail below with reference to FIG. 2, the ECU 18 is operable to determine a magnetic flux of the one or more permanent magnets of the motor 12, a temperature of the one or more permanent magnets of the motor 12, and/or an optimized current for starting the motor 12 from a resting state, as necessary.

To do so, the ECU 18 includes a number of electronic components commonly associated with electronic units utilized in the control of electromechanical systems. For example, the ECU 18 may include, amongst other components customarily included in such devices, a processor such as a microprocessor 26 and a memory device 28. The memory device 28 may be embodied as one or more non-transitory, machine-readable media. The memory device 28 is provided to store, amongst other things, instructions in the form of, for example, a software routine (or routines) which, when executed by the microprocessor 26, allows the ECU 18 to control operation of the drive system 10.

The ECU 18 also includes an analog interface circuit 30. The analog interface circuit 30 converts output signals (e.g., from the inverter 14) into signals which are suitable for presentation to an input of the microprocessor 26. In particular, the analog interface circuit 30, by use of an analog-to-digital (A/D) converter (not shown) or the like, converts analog signals into digital signals for use by the microprocessor 26. It should be appreciated that the A/D converter may be embodied as a discrete device or number of devices, or may be integrated into the microprocessor 26. In addition to receiving signals from the inverter 14, it is also contemplated that the ECU 18 may receive output signals from one or more current sensors, temperature sensors, rotor speed sensors, and/or rotor position sensors associated with the motor 12. According to the present disclosure, however, these additional sensors are not necessary components of the drive system 10. It should also be appreciated that if the inverter 14 (or any other sensor associated with the drive system 10) generates a digital output signal, the analog interface circuit 30 may be bypassed.

Similarly, the analog interface circuit 30 converts signals from the microprocessor 26 into output signals which are suitable for presentation to the electrically-controlled components associated with the drive system 10 (e.g., the inverter 14). In particular, the analog interface circuit 30, by use of a digital-to-analog (D/A) converter (not shown) or the like, converts the digital signals generated by the microprocessor 26 into analog signals for use by the electronically-controlled components associated with the drive system 10. It should be appreciated that, similar to the A/D converter described above, the D/A converter may be embodied as a discrete device or number of devices, or may be integrated into the microprocessor 26. It should also be appreciated that if the inverter 14 (or any other electronically-controlled component associated with the drive system 10) operates on a digital input signal, the analog interface circuit 30 may be bypassed.

Thus, the ECU 18 may control and/or monitor operation of the motor 12 via the inverter 14. In particular, the ECU 18 executes a routine including, amongst other things, a control scheme in which the ECU 18 monitors one or more signals from the inverter 14 (e.g., a BEMF waveform) and any other sensors associated with the drive system 10 to control the current supplied by the inverter 14 to the plurality of coils of the motor 12. As part of this control scheme, the ECU 18 may perform numerous calculations, either continuously or intermittently, including looking up values in preprogrammed tables, in order to execute algorithms to perform such functions as integrating a BEMF waveform received from the inverter 14, determining an amplitude of the integrated BEMF waveform, determining a magnetic flux of the one or more permanent magnets of the motor 12, determining a temperature of the one or more permanent magnets, determining an optimized current for starting the motor 12 from a resting state, etcetera.

Figure 2:
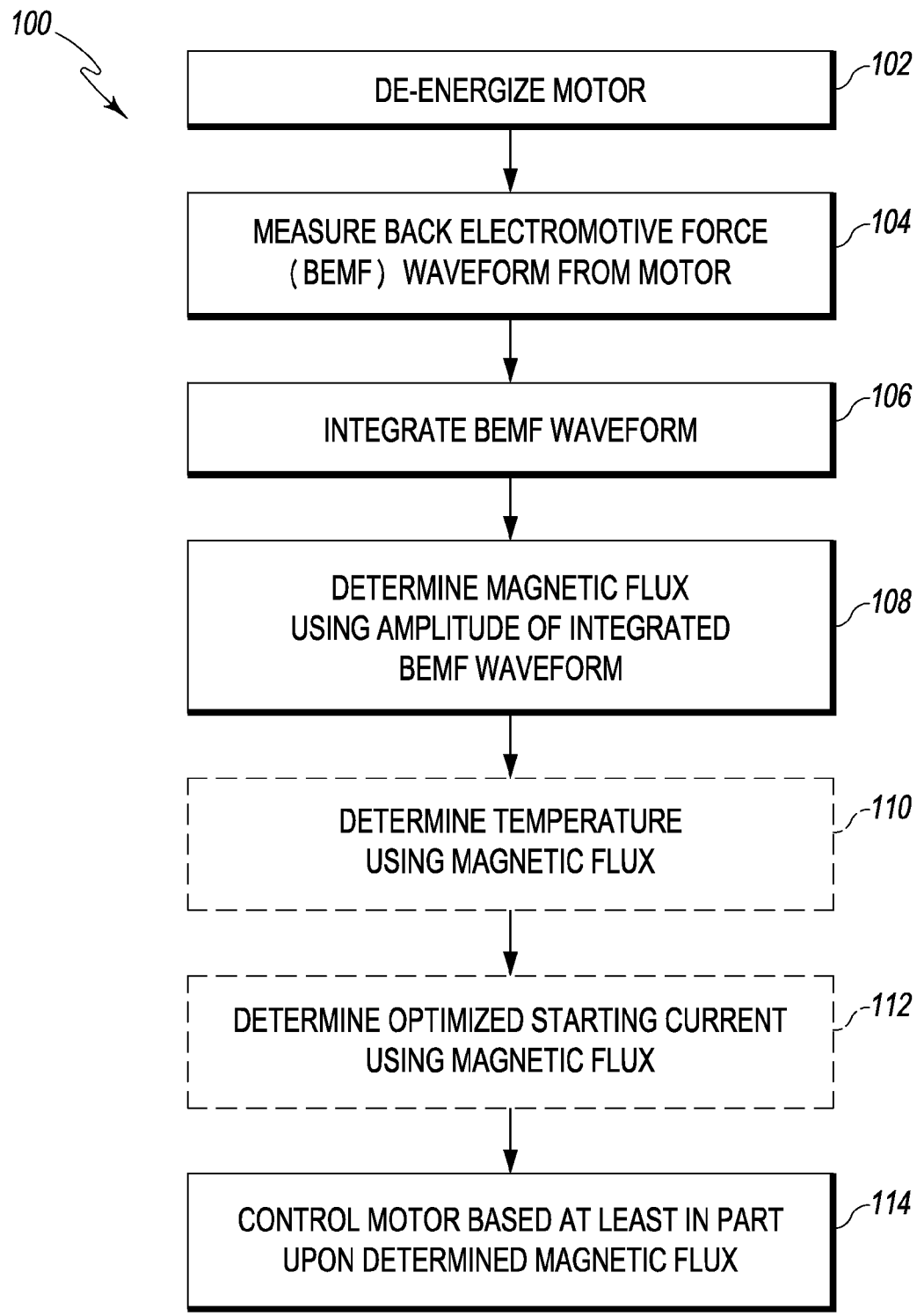
FIG. 2 is a simplified flowchart of a method of operating the drive system of FIG. 1.

Referring now to FIG. 2, an illustrative embodiment of a method of operating the drive system 10 of FIG. 1 is illustrated as a simplified flow diagram. The operating process 100 may be executed by the ECU 18 (in conjunction with the inverter 14) to control the current supplied to the motor 12 based at least in part upon the magnetic flux of the one or more permanent magnets of the motor 12, determined using a BEMF waveform from the motor 12. The operating process 100 includes a number of process steps 102-116, as shown in FIG. 2. Process steps 110, 112 may be optionally employed in the operating process 100 and are, therefore, indicated in phantom in FIG. 2.

The operating process 100 begins with process step 102, in which the ECU 18 instructs the inverter 14 to de-energize the motor 12. Prior to process step 102, the inverter 14 will have energized the motor 12 by supplying current along the electrical connections 20, 22, 24. In process step 102, the inverter 14 will cease supplying current to the plurality of coils of the motor 12 in response to receiving an appropriate signal (or the absence of an appropriate signal) from the ECU 18. Due to prior momentum, however, the rotor of the motor 12 will continue to rotate in process step 102. Under these conditions (as described above), the motor 12 will generate a BEMF waveform that may be measured across a number of the electrical connections 20, 22, 24.

After process step 102, the operating process 100 proceeds to process step 104, in which the inverter 14 measures the BEMF waveform that is generated by the motor 12. One illustrative BEMF waveform 200 that might be measured in process step 104 is graphically shown in FIG. 3. As can be seen in FIG. 3, the amplitude and frequency of the BEMF waveform 200 decrease over time as the rotor of the motor 12 slows down (the motor 12 being de-energized). As discussed above, in alternative embodiments, the BEMF waveform 200 may be measured by one or more voltage sensors (separate from the inverter 14) positioned along one or more of the electrical connections 20, 22, 24. In any case, the inverter 14 or the one or more voltage sensors transmit the BEMF waveform 200 (or information concerning the BEMF waveform 200) to the ECU 18 in process step 104.

After process step 104, the operating process 100 proceeds to process step 106, in which the ECU 18 integrates the BEMF waveform 200 to generate an integrated BEMF waveform 202. One illustrative integrated BEMF waveform 202 (corresponding to the BEMF waveform 200) that may be generated in process step 106 is also graphically shown in FIG. 3. The ECU 18 may integrate the BEMF waveform 200 in real-time, as it is received from the inverter 14, or after the entire BEMF waveform 200 has been received. As shown in FIG. 3, the peak-to-peak amplitude of the integrated BEMF waveform 202 generally remains constant, despite the decreasing amplitude and frequency of the BEMF waveform 200.

After process step 106, the operating process 100 proceeds to process step 108, in which the ECU 18 determines a magnetic flux of the one or more permanent magnets of the motor 12 using the amplitude of the integrated BEMF waveform 202. This determination is possible because the peak-to-peak amplitude of the integrated BEMF waveform 202 is proportional to the magnetic flux of the one or more permanent magnets of the motor 12. Using the amplitude of the integrated BEMF waveform 202 as an input, the ECU 18 may determine the magnetic flux mathematically or via a look-up-table. After determining the magnetic flux of the one or more permanent magnets of the motor 12, the operating process 100 may proceed to process step 114. In some embodiments, however, the operating process 100 may first determine additional characteristics of the motor 12 and its one or more permanent magnets in process steps 110 and 112.

After process step 108, the operating process 100 optionally proceeds to process step 110, in which the ECU 18 determines a temperature of the one or more permanent magnets of the motor 12. This determination is possible because the magnetic flux of the one or more permanent magnets is predictably related to the temperature of the one or more permanent magnets. Thus, the ECU 18 may determine the temperature of the one or more permanent magnets of the motor 12 by comparing the determined magnetic flux to a known magnetic flux corresponding to a known temperature. This known magnetic flux corresponding to a known temperature may be pre-programmed into the memory device 28 of the ECU 18 by designers of the motor 12. Additionally or alternatively, the known magnetic flux corresponding to a known temperature may have been determined by the ECU 18 at an earlier time and stored in the memory device 28 for later retrieval and comparison.

In some embodiments of process step 110, the ECU 18 may determine a temperature T of the one or more permanent magnets of the motor 12 using the following mathematical relationship:

$$\Phi = \Phi_0[1 - k(T - T_0)] \quad (1).$$

In Equation 1, $\Phi$ is the magnetic flux of the one or more permanent magnets of the motor 12 that was determined in process step 108, $\Phi_0$ is a known magnetic flux of the one or more permanent magnets corresponding to a known temperature $T_0$, and k is a constant for the motor 12. Using this relationship, the ECU 18 may determine the temperature T of the one or more permanent magnets of the motor 12 either mathematically or via a look-up-table.

After process step 110 (or process step 108, if optional process step 110 is unneeded or not employed), the operating process 100 proceeds to process step 112. In process step 112, the ECU 18 determines an optimized current for starting the motor 12 from a resting state (i.e., a de-energized motor and/or a stationary rotor). This "optimized current" may be a minimum current required to start the motor 12 with minimum drum acceleration for a particular load or a maximum current that will preserve against demagnetization of the one or more permanent magnets of the motor 12 while giving maximum drum acceleration. Using the magnetic flux of the one or more permanent magnets of the motor 12 that was determined in process step 108, the ECU 18 may determine the optimized current that should be supplied by the inverter 14. The optimized current will change with the magnetic flux of the one or more permanent magnets of the motor 12, which, in turn, will change with the temperature of the one or more permanent magnets.

In practice, the optimized current for starting the motor 12 from a resting state will change over time, depending on the duty cycle of the washing machine. For example, at the beginning of a heavy duty cycle (e.g., several starts per hour), the motor 12 will be cooler, and a minimum starting current will be lower. As the one or more permanent magnets of the motor 12 increase in temperature (toward a thermal steady-state), the magnetic flux will be lower, and the minimum starting current will thus be higher. By calculating the minimum starting current for each start of motor 12, the drive system 10 may avoid supplying unneeded, excess current and causing the one or more permanent magnets to reach their peak temperature more quickly then necessary, resulting in greater efficiency for the motor 12.

After process step 112 (or one of process steps 108, 110, if one or both of optional process steps 110, 112 are unneeded or not employed), the operating process 100 proceeds to process step 114. In process step 114, the ECU 18 controls the current supplied to the motor 12 using the information determined in one or more of process steps 108, 110, 112. For instance, the ECU 18 may control the current supplied to the motor 12 based at least in part upon the determined magnetic flux and/or the determined temperature of the one or more permanent magnets (determined in process steps 108, 110, respectively). Additionally or alternatively, the ECU 18 may control the current supplied to the motor 12 using the minimum starting current determined in process step 112. In the illustrative embodiment, the ECU 18 controls the current supplied to the motor 12 by providing appropriate control signals to the inverter 14.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A washing machine comprising:
   a motor including a plurality of coils and one or more permanent magnets;
   an inverter configured to supply current to the plurality of coils and to measure a back electromotive force (BEMF) waveform from the plurality of coils; and
   an electronic control unit (ECU) configured to (i) integrate the BEMF waveform to generate an integrated BEMF waveform, (ii) determine a magnetic flux of the one or more permanent magnets as a function of an amplitude of the integrated BEMF waveform, and (iii) control the current supplied by the inverter based at least in part upon the determined magnetic flux.

2. The washing machine of claim 1, wherein the ECU is further configured to control the inverter to measure the BEMF waveform while supplying no current to the plurality of coils.

3. The washing machine of claim 1, wherein the ECU is further configured to determine a temperature of the one or more permanent magnets by comparing the determined magnetic flux to a known magnetic flux corresponding to a known temperature.

4. The washing machine of claim 3, wherein the ECU is further configured to control the current supplied by the inverter based at least in part upon the determined temperature of the one or more permanent magnets.

5. The washing machine of claim 1, wherein the ECU is further configured to determine a temperature T of the one or more permanent magnets using the relationship:

$$\Phi = \Phi_0[1 - k(T - T_0)],$$

where $\Phi$ is the determined magnetic flux of the one or more permanent magnets, $\Phi_0$ is a known magnetic flux of the one or more permanent magnets corresponding to a known temperature $T_0$, and k is a constant for the motor.

6. The washing machine of claim 1, wherein the ECU is further configured to determine, using the determined magnetic flux, an optimized current for starting the motor from a resting state.

7. A method comprising:
   measuring a back electromotive force (BEMF) waveform from a motor of a washing machine;
   integrating the BEMF waveform to generate an integrated BEMF waveform;
   determining a magnetic flux of one or more permanent magnets of the motor as a function an amplitude of the integrated BEMF waveform; and
   controlling a current supplied to the motor based at least in part upon the determined magnetic flux.

8. The method of claim 7, wherein measuring the BEMF waveform comprises measuring the BEMF waveform using an inverter of the washing machine that supplies current to the motor.

9. The method of claim 7, wherein measuring the BEMF waveform comprises measuring the BEMF waveform while no current is being supplied to the motor.

10. The method of claim 8, wherein measuring the BEMF waveform comprises measuring the BEMF waveform while a drum of the washing machine decelerates.

11. The method of claim 7, further comprising determining a temperature of the one or more permanent magnets by comparing the determined magnetic flux to a known magnetic flux corresponding to a known temperature.

12. The method of claim 11, wherein controlling the current supplied to the motor comprises controlling the current supplied to the motor based at least in part upon both the determined magnetic flux and the determined temperature of the one or more permanent magnets.

13. The method of claim 7, further comprising determining a temperature T of the one or more permanent magnets using the relationship:

$$\Phi = \Phi_0[1 - k(T - T_0)],$$

where $\Phi$ is the determined magnetic flux of the one or more permanent magnets, $\Phi_0$ is a known magnetic flux of the one or more permanent magnets corresponding to a known temperature $T_0$, and k is a constant for the motor.

14. The method of claim 7, further comprising determining, using the determined magnetic flux, an optimized current for starting the motor from a resting state.

15. One or more non-transitory, machine-readable media comprising a plurality of instructions which, when executed, cause an electronic control unit (ECU) of a washing machine to:
   receive a back electromotive force (BEMF) waveform measured from a motor of the washing machine;
   integrate the BEMF waveform to generate an integrated BEMF waveform;
   determine a magnetic flux of one or more permanent magnets of the motor as a function of an amplitude of the integrated BEMF waveform; and
   control a current supplied to the motor based at least in part upon the determined magnetic flux.

16. The one or more non-transitory, machine-readable media of claim 15, wherein the plurality of instructions further cause the ECU to receive a BEMF waveform that was measured while no current was supplied to the motor.

17. The one or more non-transitory, machine-readable media of claim 15, wherein the plurality of instructions further cause the ECU to determine a temperature of the one or more permanent magnets by comparing the determined magnetic flux to a known magnetic flux corresponding to a known temperature.

18. The one or more non-transitory, machine-readable media of claim 17, wherein the plurality of instructions further cause the ECU to control the current supplied to the motor based at least in part upon the determined temperature of the one or more permanent magnets.

19. The one or more non-transitory, machine-readable media of claim 15, wherein the plurality of instructions further cause the ECU to determine a temperature T of the one or more permanent magnets using the relationship:

$$\Phi = \Phi_0[1 - k(T - T_0)],$$

where $\Phi$ is the determined magnetic flux of the one or more permanent magnets, $\Phi_0$ is a known magnetic flux of the one or more permanent magnets corresponding to a known temperature $T_0$, and k is a constant for the motor.

20. The one or more non-transitory, machine-readable media of claim 15, wherein the plurality of instructions further cause the ECU to determine, using the determined magnetic flux, an optimized current for starting the motor from a resting state.

* * * * *